US007768175B2

(12) United States Patent
Igawa et al.

(10) Patent No.: US 7,768,175 B2
(45) Date of Patent: Aug. 3, 2010

(54) BRUSH MANUFACTURING METHOD, MOTOR MANUFACTURING METHOD, BRUSH, MOTOR, AND ELECTROMOTIVE POWER STEERING DEVICE

(75) Inventors: Katsuyuki Igawa, Okazaki (JP); Kazuhiko Fujita, Kashiba (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 12/181,404

(22) Filed: Jul. 29, 2008

(65) Prior Publication Data

US 2009/0033172 A1 Feb. 5, 2009

(30) Foreign Application Priority Data

Aug. 2, 2007 (JP) ............................. 2007-201928
Aug. 8, 2007 (JP) ............................. 2007-206775

(51) Int. Cl.
*H02K 13/00* (2006.01)

(52) U.S. Cl. ....................... 310/248; 310/239; 310/240; 310/246; 310/247; 310/251

(58) Field of Classification Search ......... 310/237–248, 310/251, 58–59, 61, 64
See application file for complete search history.

(56) References Cited

U.S. PATENT DOCUMENTS 6,731,040 B1 5/2004 Tanaka et al.
7,154,203 B2 * 12/2006 Nakajima et al. ............. 310/83

FOREIGN PATENT DOCUMENTS

| | | | |
|---|---|---|---|
| DE | 8808697 | | 8/1988 |
| DE | 102004051463 | | 4/2006 |
| DE | 102005047083 | | 4/2007 |
| GB | 813649 | | 5/1959 |
| JP | 55109155 | A * | 8/1980 |
| JP | 2006-311639 | A | 11/2006 |

OTHER PUBLICATIONS

English Text (abstract and constitution on JP55-109155A, 1980).*

* cited by examiner

*Primary Examiner*—Quyen Leung
*Assistant Examiner*—Jose A Gonzalez Quinones
(74) *Attorney, Agent, or Firm*—Oliff & Berridge PLC

(57) ABSTRACT

A manufacturing method for a brush that can reduce contact surface area between a commutator and the brush, thereby reducing frictional noise, is provided. Specifically, a method to manufacture a brush, which provides one surface with contact surfaces that make sliding contact with the commutator, involves a step to mold a molded body and a step to cut the molded body. In the molding process, carbon powder containing copper powder is sintered to form a molded body having a groove on the top surface along the direction of the axis of rotation of the commutator, and curved surface margins in the margins of the top surface in the direction of the axis of rotation. In the cutting step, the central part of the top surface of the molded body is cut by a grinding stone along the cutting direction to form contact surfaces between the margins of the top surface.

5 Claims, 7 Drawing Sheets

BRUSH MANUFACTURING METHOD, MOTOR MANUFACTURING METHOD, BRUSH, MOTOR, AND ELECTROMOTIVE POWER STEERING DEVICE

CROSS REFERENCE TO PRIOR RELATED APPLICATIONS

The present application claims priority under 35 U.S.C. §119 to Japanese Patent Application No. 2007-206775, filed on Aug. 8, 2007, and to Japanese Patent Application No. 2007-201928, filed on Aug. 2, 2007. The content of these applications is incorporated herein by reference in their entirety.

FIELD OF THE INVENTION

The present invention relates to a brush manufacturing method, a motor manufacturing method, a brush, a motor, and an electromotive power steering device that can reduce vibration caused by contact with the commutator.

BACKGROUND OF THE INVENTION

Electromotive power steering devices have a steering shaft that is configured by connecting an input shaft and an output shaft through a torsion bar. A steering wheel is connected to the input shaft side of the steering shaft, and a steering mechanism is connected to the output shaft side. Then, when rotating the steering wheel in one direction, steering torque applied to the input shaft is detected by the relative angular displacement in the rotational direction of the input shaft and output shaft produced by the intervention of the torsion bar, and the motor generates rotational force corresponding to the size of the steering torque in the direction of application of the steering torque. The device is configured such that this rotational force is transmitted to the output shaft, and output force augmented in the same direction as the direction of rotation of the steering wheel is transmitted from the output shaft to the steering mechanism.

The steering assist motor has a rotational shaft and an armature winding around the rotational shaft. Then, by supplying current to the armature winding, the rotational shaft rotates by electromagnetic action and rotational force is produced. In addition, the motor has a brush and a commutator that the brush contacts; and electric power is transmitted and supplied to the armature winding through the commutator by sending electric power from an outside source to the brush and the brush making contact with the commutator.

In this kind of motor, if the contact area between the brush and commutator is large, then a large volume of frictional noise is produced from the contact surface parts causing discomfort to the operator, and therefore a motor that reduces the noise caused by the frictional noise has been disclosed in Japanese Patent Application Publication No. 2006-311639 ("JP '639"). The motor described in JP '639 sets the contact area between the brush and the commutator based on the brush and the current flowing in the brush.

SUMMARY OF THE INVENTION

The motor described in JP '639 can reduce the frictional noise, but the present inventors discovered that, compared to the conventional method of cutting away the central part of one surface of the brush and making the part other than the cut-away central part be the contact surface part, making the contact surface part be an even smaller area could reduce the frictional noise with the commutator without hindering the supply of current.

The present invention is based on this discovery, and an object of the present invention is to provide a brush manufacturing method, a motor manufacturing method, a brush, a motor, and an electromotive power steering device that reduce the contact area between the brush and the commutator, which is a conductive rotating body, and that can reduce the frictional noise at the contact surface part.

The brush manufacturing method of the present invention is a manufacturing method of a brush in which the central part of the one surface that is to make pressure contact with a rotating commutator is cut away to form contact surface parts, which make sliding contact with the aforementioned commutator on the related one surface, and a non-contact surface part, which does not make contact with the aforementioned commutator, having the steps of: molding a conductive member, in which both margins of the aforementioned one surface that are to be margins in the direction of the axis of rotation of the aforementioned commutator, are made into forms that slant away from the commutator and face a direction other than that of the aforementioned direction of the axis of rotation; and cutting away the aforementioned central part to form the aforementioned contact surface parts between the aforementioned margins.

The motor manufacturing method of the present invention is a motor manufacturing method that provides a brush in which the central part of the one surface that is to make pressure contact with a rotating commutator is cut away to form contact surface parts, which make sliding contact with the aforementioned commutator on the related one surface, and a non-contact surface part, which does not make contact with the aforementioned commutator, having the steps of: molding a conductive member to have a shape such that both margins of the aforementioned one surface, which are to be the margins in the direction of the axis of rotation of the aforementioned commutator, are made into forms that slant away from the commutator and face a direction other than that of the aforementioned direction of the axis of rotation; cutting away the aforementioned central part to form the aforementioned contact surface parts between the aforementioned margins; and installing the brush molded by the aforementioned molding process.

Moreover, the brush of the present invention is a brush that has the central part of the one surface that is to make contact with a rotating commutator cut away to have contact surface parts by which the related one surface makes sliding contact with the aforementioned commutator, and non-contact surface parts that do not make contact with the aforementioned commutator, wherein both margins of the aforementioned one surface in the direction of the axis of rotation of the aforementioned commutator are slanted away from the commutator and face a direction other than that of the aforementioned direction of the axis of rotation, and the aforementioned contact surface parts are formed between the aforementioned slanted margins and the aforementioned cut-away central part.

Moreover, the motor of the present invention is a motor containing a brush that has the central part of the one surface that is to make contact with a rotating commutator cut away to have contact surface parts by which the related one surface makes sliding contact with the aforementioned commutator, and non-contact surface parts that do not make contact with the aforementioned commutator, wherein both margins of the aforementioned one surface in the direction of the axis of rotation of the aforementioned commutator are slanted away from the commutator and face a direction other than that of the aforementioned direction of the axis of rotation, and the contact surface parts of the aforementioned brush are formed between the aforementioned slanted margins and the aforementioned cut-away central part.

Moreover, the electromotive power steering device of the present invention is an electromotive power steering device containing a motor having a brush that has the central part of the one surface that is to make contact with a rotating commutator cut away to have contact surface parts by which the related one surface makes sliding contact with the aforementioned commutator, and non-contact surface parts that do not make contact with the aforementioned commutator, and a transmission mechanism that transmits the rotation of the aforementioned motor to a steering member, wherein both margins of the aforementioned one surface in the direction of the axis of rotation of the aforementioned commutator are slanted away from the commutator and face a direction other than that of the aforementioned direction of the axis of rotation, and the contact surface parts of the aforementioned brush are formed between the aforementioned slanted margins and the aforementioned cut-away central part.

According to the present invention, the margins, which are slanted away from the commutator and face a direction other than that of the direction of the axis of rotation of the commutator, do not contact the commutator. Consequently, once the central part of the one surface that makes pressure contact with the commutator is cut away making the cut-away central part a non-contact surface part, when compared to the conventional method that takes everything other than the central part as contact surface parts, it is possible to make the area of the contact surface part smaller by the portion of the margins that have been made non-contact surface parts. For the brush and the motor that has the brush, the frictional noise with the commutator at the contact surface part can thereby be decreased by the portion that the surface area was reduced. Moreover, by reducing the frictional noise, it is possible to make an electromotive power steering device that does not make the operator feel uncomfortable because of the frictional noise.

Moreover, according to the present invention, when manufacturing the brush, a conductive member is molded such that both margins of the one surface of the brush have a shape slanted away from the commutator and face a direction other than that of the direction of the axis of rotation. A brush with a smaller contact surface area can thereby be manufactured without changing the number of processing steps compared to the conventional brush manufacturing process that takes everything other than the cut-away central part as contact surface parts.

DETAILED DESCRIPTION OF THE INVENTION

Preferred embodiments of the present invention will be explained in detail below using diagrams.

Figure 1:
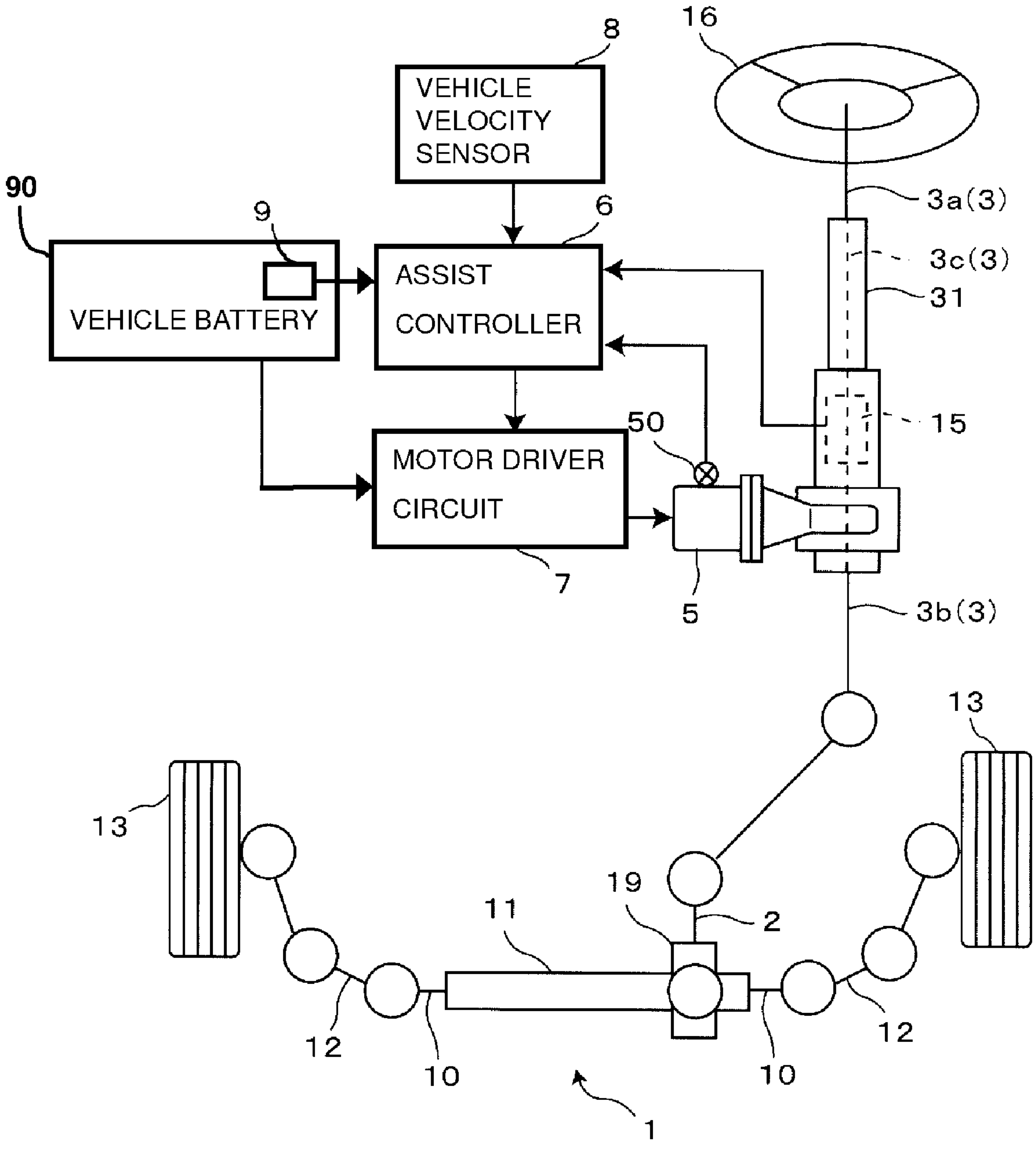
FIG. 1 is a schematic diagram indicating the configuration of an electromotive power steering device related to an embodiment of the present invention.

FIG. 1 is a schematic diagram indicating the configuration of an electromotive power steering device related to an aspect of the present embodiment. The electromotive power steering device contains a rack and pinion steering mechanism 1. The steering mechanism 1 has a rack shaft 10 supported so as to move freely axial-lengthwise in the interior of a rack housing 11 extending to the right and left inside the car body not indicated in the diagram, and a pinion shaft 2 supported so as to rotate freely in the interior of the pinion housing 19 that intersects the rack housing 11 midway.

Both ends of the rack shaft 10 that protrudes to the exterior from both sides of the rack housing 11 are connected through separate tie rods 12 to right and left front wheels 13 as the wheels for steering. Moreover, the upper end of the pinion shaft 2 that protrudes to the exterior from the pinion housing 19 is connected through a steering shaft 3 to a steering wheel 16 as a steering member. The pinion, not indicated in the diagram, is formed as a single unit on the lower part of the pinion shaft 2 extending into the interior of a pinion housing 19, and at the part that intersects with the rack housing 11, the pinion meshes with the rack at the suitable length midway on the rack shaft 10.

The steering shaft 3 is configured by connecting an input shaft 3*a* and an output shaft 3*b* through a torsion bar 3*c*. The steering shaft 3 is supported so as to rotate freely in the interior of the cylindrical housing 31, and through the housing 31, is assembled to maintain an inclined position dropping to the front in the interior of the passenger compartment, which is not indicated in the diagram. The pinion shaft 2 is connected to the lower end of the output shaft 3*b* of the steering shaft 3 that protrudes to below the housing 31, and the steering wheel 16 is fixed on the upper end of the input shaft 3*a* of the steering shaft 3 that protrudes to above the housing 31.

According to the configuration above, the steering shaft 3 rotates based on the rotational operation of the steering wheel 16; this rotation is transferred to the pinion shaft 2; the rotation of the pinion shaft 2 is converted to an axial-lengthwise movement of the rack shaft 10 at the meshing part of the pinion and the rack; and this movement of the rack shaft 10 is transferred to and steers the left and right front wheels 13 through separate tie rods 12.

A torque sensor 15 that detects the steering torque applied to the steering shaft 3 by the rotational operation of the steering wheel 16 is provided midway in the housing 31 that supports the steering shaft 3. A steering-assist motor 5 is installed in a position lower than the torque sensor 15.

The steering conducted as described above is assisted, for example, by a configuration in which: the shaft core of the steering-assist motor 5 is installed roughly orthogonally to the outside to the housing 31; a worm 33 (refer to FIG. 2) affixed to the output end extending into the interior of the housing 31 meshes with a worm wheel 32 (refer to FIG. 4) set and affixed to the outside of the steering shaft 3; and the rotation of the motor 5 is decelerated by the worm 33 and the worm wheel 32, and is transferred to the steering shaft 3. The steering-assist motor 5 installed in this way is driven following the control commands given from an assist controller 6 through a motor drive circuit 7.

The assist controller 6 contains a CPU (central processing unit), a ROM (read only memory), and a RAM (random access memory), and is configured such that assist control is conducted by the operation of the CPU following the control program stored in the ROM. The steering torque value detected by the torque sensor 15 and the vehicle velocity value detected by a vehicle velocity sensor 8, the motor current detection value output by a motor current sensor 50 to detect the current flowing in the steering-assist motor 5, the battery voltage value detected by a battery sensor 9 set up on the vehicle battery 90, and the like are given to the assist controller 6, and the steering-assist motor 5 is driven through the motor drive circuit 7 based on the various values.

Figure 2:
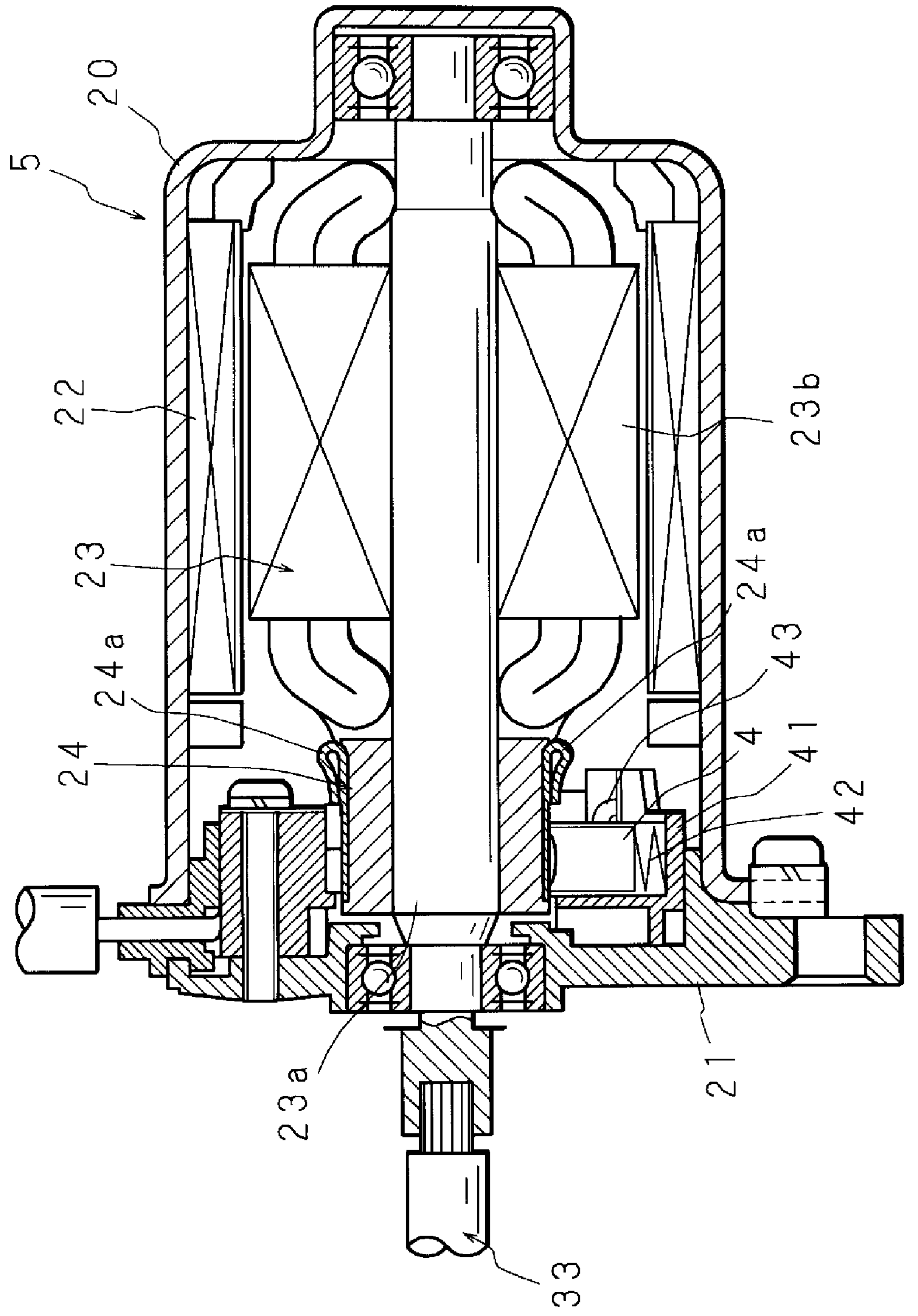
FIG. 2 is a cross-sectional diagram of a motor in the axial direction.
Figure 3:
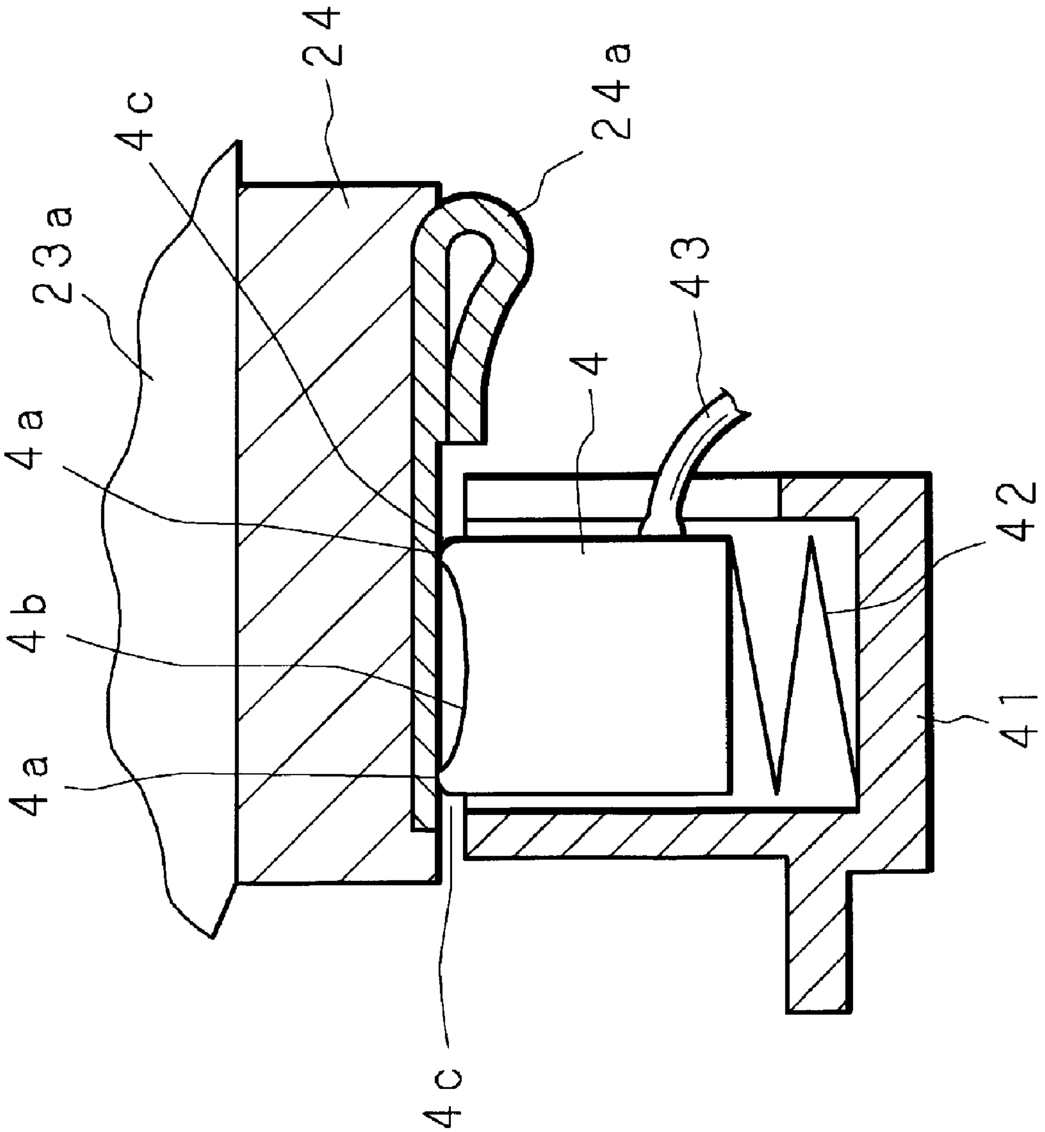
FIG. 3 is an enlarged cross-sectional diagram of the area of contact between a brush and a commutator used in a motor.
Figure 4:
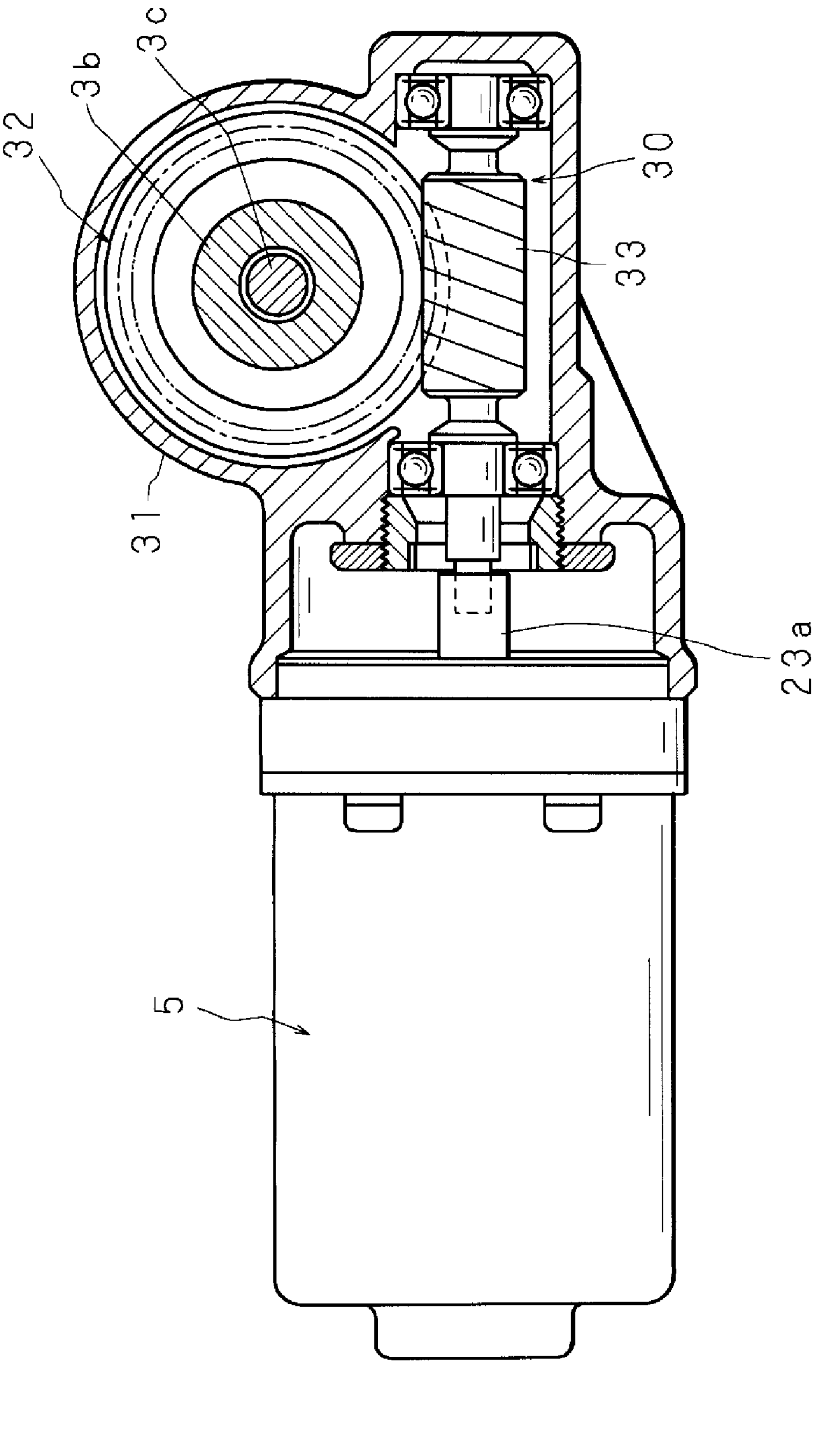
FIG. 4 is a cross-sectional diagram in a direction perpendicular to a steering shaft indicating the configuration of a transmission mechanism and a motor part used in an electromotive power steering device.

Next, the steering-assist motor 5 will be described in detail. FIG. 2 is an axial cross-sectional diagram of the motor, and FIG. 3 is an enlarged cross-sectional diagram of the area of contact between the brush and commutator used in the motor. FIG. 4 is a cross-sectional diagram perpendicular to the steering shaft indicating the configuration of the transmission mechanism and motor part used in an electromotive power steering device.

In FIG. 2, 20 is a motor housing. The motor housing 20 is of a cylindrical shape with a bottom, and the open end is closed off by a roughly disk-shaped cover 21. The motor housing 20 is connected to the housing 31 through the cover 21, and one end of a rotor shaft 23*a* is connected to the worm 33 passing through the center of the cover 21. The worm 33 meshes with the gear part of the worm wheel 32 that is fitted and fixed to the output shaft 3*b* connected to the torsion bar 3*c*. Then, the worm 33 rotates; the worm wheel 32 rotates following the rotation of the worm 33; and the rotational force from the output shaft 3*b* is thereby transmitted to the steering mechanism 1.

A cylindrically shaped stator 22 is fitted and fixed into the motor housing 20, and the cylindrically shaped rotor 23 is arranged rotatably inside the stator 22. The rotor 23 has a rotor shaft 23*a*, and an armature winding 23*b* is provided around the shaft of the rotor shaft 23*a*. A commutator 24 is cylindrically shaped, is coaxially fitted outside the rotor shaft 23*a* and rotates in a single unit with the rotor shaft 23*a*, and multiple commutator pieces 24*a* are provided interposed with insulation. The commutator pieces 24*a* are connected to the armature wiring 23*b*.

As indicated in FIG. 3, a brush holder 41 is box-shaped with one open surface, and is fixed to the cover 21 on the side toward the interior of the motor 5; the brush 4, which is made of carbon, is contained inside the opening, and a coil spring 42 is contained deeper in the interior. The brush 4 is disposed toward the commutator 24 by the elasticity of the coil spring 42. Moreover, the brush 4 is connected to the motor drive circuit 7 through a lead 43 that is connected to the surface of the brush 4, and the motor drive circuit 7 is connected to the vehicle battery 90 (refer to FIG. 1). Then, power from the vehicle battery 90 is sent to the brush 4, and power is supplied to the armature winding 23*b* by transmitting power through the commutator 24 that the brush 4 contacts.

Figure 5A:
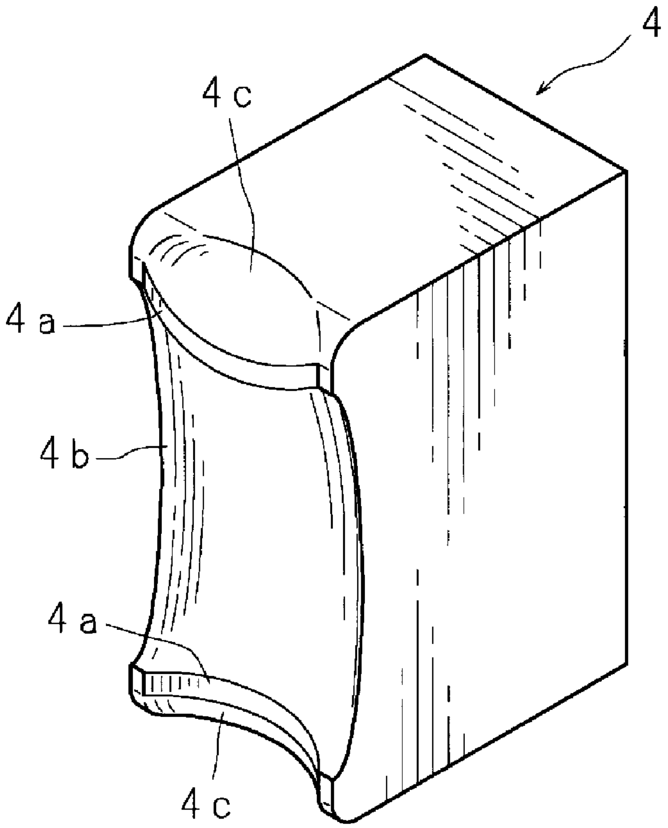
FIG. 5(*a*) is a perspective view diagram of a brush related to the present invention, and FIG. 5(*b*) is a top view diagram of the brush.
Figure 5B:
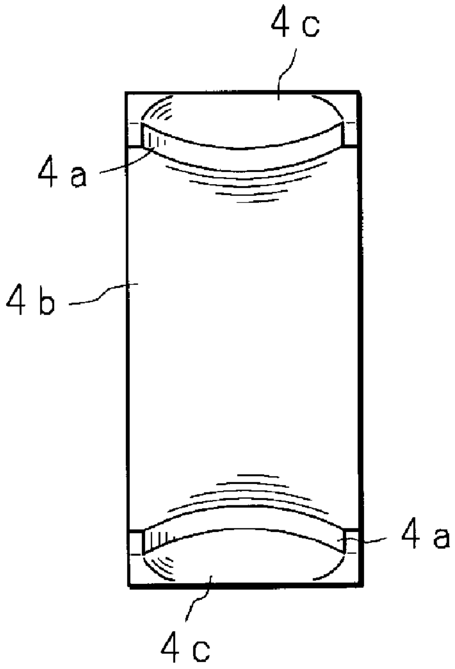

FIG. 5(*a*) is a perspective view diagram of a brush related to the present invention; and FIG. 5(*b*) is a top view diagram of the brush. The brush 4 has a roughly rectangular shape, and the contact surface parts 4*a* that contact the commutator are provided on the top surface (surface on the side that makes pressure contact with the commutator) and are separated at a distance in the direction of the axis of rotation of the commutator. The brush 4 is longer in the direction of the axis of rotation than in the sliding direction (peripheral direction of the commutator). The contact surface parts 4*a* form a concave surface that makes sliding contact with the peripheral surface of the commutator. In addition, contact surface parts 4*a* are band-shaped in a long curve in the sliding direction, and the dimensions in the direction of the axis of rotation (width of the bands) is fixed.

On the top of the brush 4 are non-contact surface part 4*b* and non-contact surface parts 4*c*, which do not contact the commutator. The non-contact surface part 4*b* is formed between the contact surface parts 4*a*, and the central part of the top surface of the brush 4 is a recession curved toward the back surface (direction opposite that of the commutator to which pressure contact is made) that deepens from the contact surface parts 4*a* toward the center of the top surface. Moreover, the non-contact parts 4*c* are formed at the intersection of the top surface and the surface perpendicular to the direction of the axis of rotation of the brush 4. This region of intersection is at both margins of the top surface in the direction of the axis of rotation, and both margins bend toward the back surface and have a shape like the curvature of a removed surface.

Figure 6:
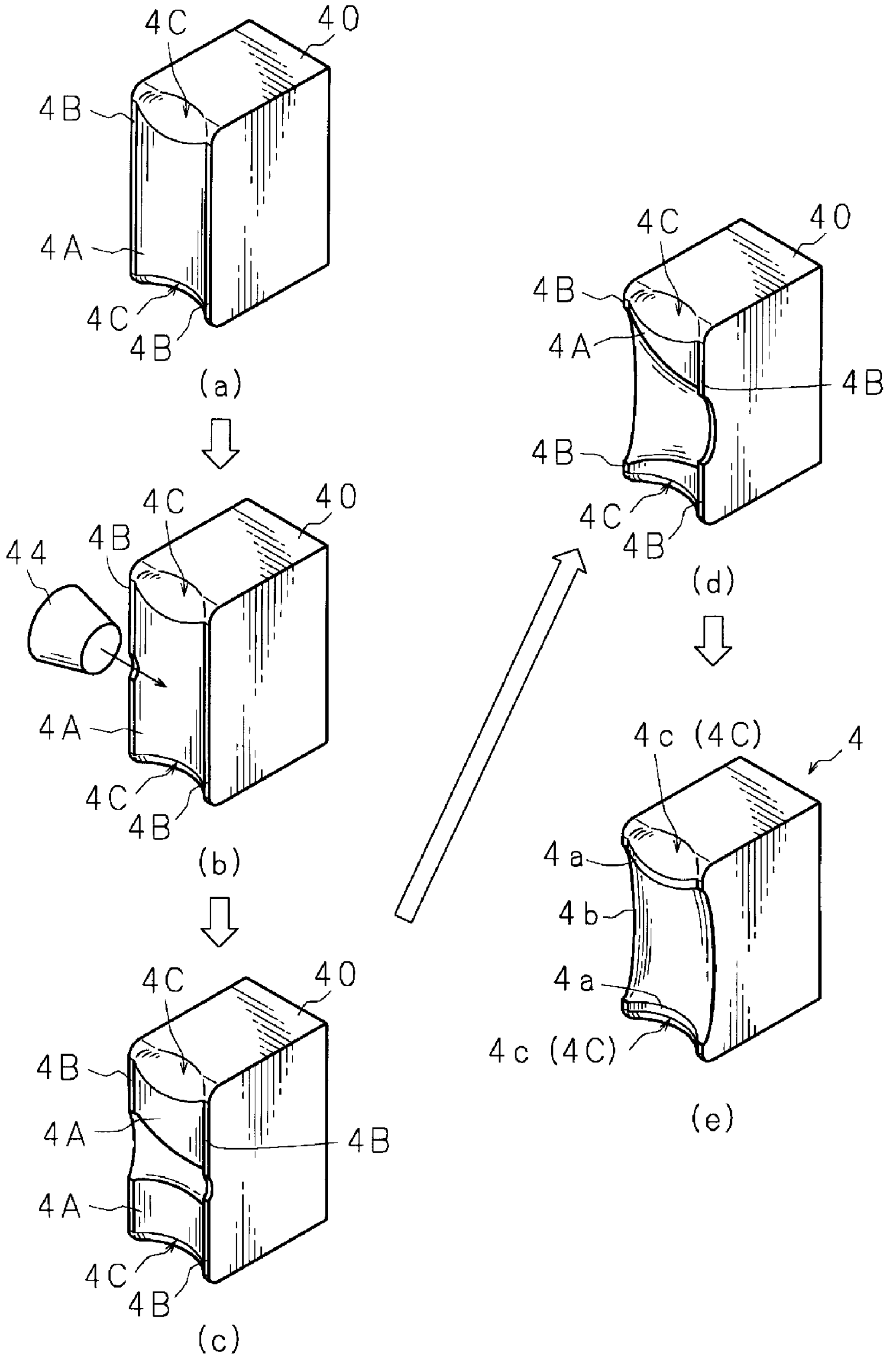
FIG. 6 is a diagram indicating the order in which a molded body is processed in a manufacturing process of the present invention.

Next, the manufacturing method of the brush 4 of the present invention will be explained. FIG. 6 is a diagram indicating the order in which the molded body is processed in the manufacturing process. First, a molded body 40 with roughly a rectangular shape is formed by sintering carbon powder containing a conductive material, for example, copper powder (FIG. 6(*a*)). The molded body 40 has a groove 4A, groove margins 4B, and margins 4C.

The groove 4A has roughly the same curvature as the outer periphery of the commutator, and is a round groove formed on the top surface along the direction of the axis of rotation of the commutator. Specifically, the width and curvature of the groove 4A are set based on the shape and size, etc., of the commutator. Moreover, the groove 4A is formed roughly in the center of the top surface when viewed perpendicularly to the direction of the axis of rotation. The groove margins 4B are roughly rectangular, and are formed on both sides of the top surface when viewed perpendicularly to the direction of the axis of rotation, and the groove 4A is interposed between the groove margins 4B. The groove margins 4B are formed by forming the groove 4A on the top surface of the molded body 40.

The margins 4C are formed on both margins in the direction of the axis of rotation on the top surface, and both margins bend or slanted or are slanted toward the back surface and have a shape like the curvature of a removed surface. Specifically, the shape of the peripheral margin of both margins 4C in a direction perpendicular to the top surface is an arc facing the direction of the axis of rotation as its center, and the shape of the peripheral margin of the cross-section of both margins 4C in the direction of the axis of rotation is also an arc. When the top surface of the molded body 40 in this state makes pressure contact with the commutator, the groove 4A contacts the peripheral surface of the commutator, and the margins 4C do not make contact with the commutator. Further, as described above, the curvature of the margins 4C is set so that the margins 4C are further to the back surface side than is the groove 4A.

Next, a grinding stone 44 is used to cut away the central part of the top surface of the molded body 40 facing the axis of rotation. The grinding stone 44 is a truncated cone having a small-diameter peripheral surface and a large-diameter peripheral surface, and is moved perpendicularly to the direction of the axis of rotation from one side to the other of the top surface on which the groove margins 4B are formed (called the "cutting direction" below). Further, because of the formation of the groove 4A and the groove margins 4B, the molded body 40 gradually deepens toward the back surface in the cutting direction going from both sides of the molded body 40 toward the center. Then, the grinding stone is arranged in relation to the molded body 40 such that the peripheral surface of the small-diameter side cuts the groove margins 4B, and the peripheral surface of the large-diameter side cuts the groove 4A, which is recessed more toward the back surface than are the groove margins 4B.

As indicated in FIG. 6(*b*), in the process of cutting with the grinding stone 44, the groove margin 4B formed on one side of the top surface is cut by the peripheral surface of the small-diameter side of the grinding stone 44 to curve convexly toward the back surface. As indicated in FIGS. 6(*c*) and 6(*d*), when further moving the grinding stone 44 in the cutting direction, the groove 4A is cut by the peripheral surface of the grinding stone 44 following the cutting direction. Moreover, the groove margin 4B formed on the other side of the top surface is cut by the peripheral surface of the small-diameter side of the grinding stone 44 to curve convexly toward the back surface. The grinding stone 44 has been omitted from FIGS. 6(*c*) and 6(*d*).

Then, the grinding stone 44 is moved further in the cutting direction, and when cutting is ended, as indicated in FIG. 6(*e*), the central part of the top surface of the molded body 40 is cut and recessed to curve convexly toward the back surface side. In this case, both margins of the groove 4A in the direction of the axis of rotation, specifically, both margins of the groove 4A near both margins 4C remain without having been cut by the grinding stone 44. Then, the parts of the groove 4A that are not cut become the contact surfaces 4*a*. Consequently, the contact surfaces 4*a* are formed between the central part that was cut by the grinding stone 44 and both margins 4C. Then, the central part of the top surface of the molded body 40 cut by the grinding stone 44 becomes the non-contact surface 4*b*. Further, both margins 4C become the non-contact surfaces 4*c* (no change).

In addition, in order to have the necessary current density, the area of the contact surfaces 4*a* is determined in accordance with the types and amounts of materials that the brush 4 contains and the current that must be supplied to the commutator, etc. Then, in the manufacturing process of the brush 4, the diameter of the grinding stone 44 and the curvatures and sizes of the groove 4A and both margins 4C, etc., are selected so as to provide the determined area and dimensions.

Figure 7:
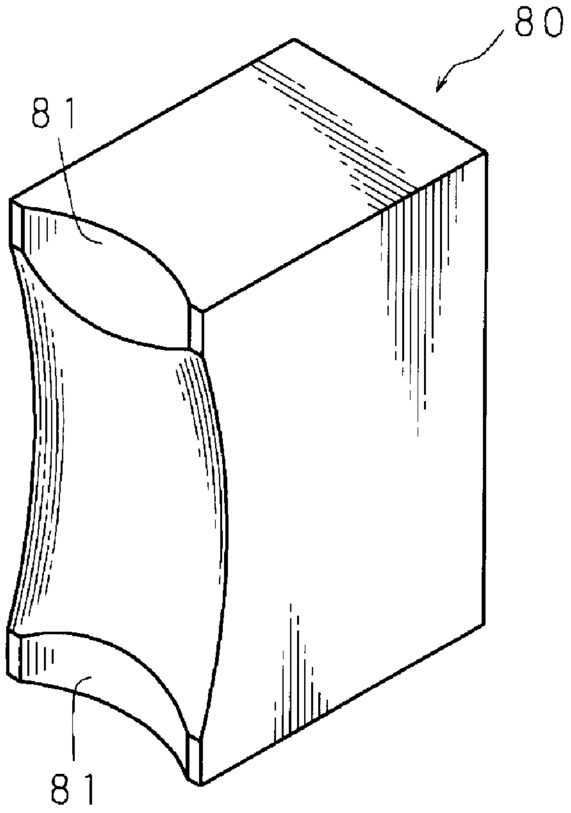
Prior Art Fig. 7
FIG. 7 is a perspective view of a conventional brush.

FIG. 7 is a perspective view of a conventional brush. As indicated in FIG. 7, both margins of the one surface of the side of the conventional brush 80 that makes pressure contact with the commutator are not slanted. Then, the central part of the one surface is cut and the parts of the one surface other than the cut central part become the contact surfaces 81 that make contact with the commutator. For this reason, when comparing the surface area of the contact surfaces 4*a* when forming the brush 4 as described above with the surface area of the contact surfaces 81 of the conventional brush 80, the brush 4 of the present invention can reduce the surface area of the contact surfaces more than that of the conventional brush 80 by the portion of both margins slanted away from the commutator 24 in an outward direction along the direction of the axis of rotation, specifically, in a direction along the direction of the axis of rotation going away from the brush 4.

Moreover, margins 4C are formed by slanting both margins of the top surface of the molded body 40 in order to reduce the surface area of the contact surfaces 4*a*, but the cutting process for forming the margins can be omitted by conducting the process to form both margins 4C when molding the molded body 40. Consequently, the number of steps of the manufacturing process can be reduced, and the surface area of the contact surfaces 4*a* can also be decreased. Moreover, in order to further reduce the contact surface, the contact surface may be cut away after cutting the central part, but in the present embodiment, the process of cutting the contact surface to make the surface areas of the contact surfaces 4*a* even smaller can be omitted, and the surface area of the contact surfaces 4*a* can still be reduced, by making the top-surface shapes of both margins 4C into arcs facing the direction of the axis of rotation as their center so that the contact surfaces 4*a* become long curving bands in the sliding direction.

The electromotive power steering device described in detail above is constituted such that when steering torque is applied to the steering wheel 16 by rotating the steering wheel 16 in one direction: the torque sensor 15 detects the steering torque by the amounts of relative displacement of the input shaft 3*a* and the output shaft 3*b* in the direction of rotation; the motor 5 generates rotational force corresponding to the size of steering torque in the direction of steering torque action based on the detection results of the torque sensor 15; the rotational force of the motor 5 is transmitted to the worm 33 and the worm 33 rotates; the rotational force is amplified and transmitted to the output shaft by the worm wheel 32 rotating in conjunction with the rotation of the worm 33; and the amplified rotational force is transmitted from the output shaft 3*b* to the steering mechanism 1 in the same direction as the direction of rotation of the steering wheel 16.

At this time, the generation of rotational moment on the brush 4 is prevented by the two contact surfaces 4*a* being respectively provided in the axial direction of the commutator 24 and the contact surfaces 4*a* contacting the peripheral surface of the commutator 24, and therefore the contact between the commutator 24 and the brush 4 is stable and vibration of the brush 4 can be reduced.

Moreover, frictional force generated on the peripheral surface of the commutator 24 can be reduced by using a brush 4 that provides non-contact surface 4*b* and non-contact surfaces 4*c* and makes the contact surface area with the commutator 24 (total surface area of the contact surfaces 4*a*) smaller than when the entire surface makes contact, and therefore, brush 4 vibration caused by frictional force can be reduced.

By reducing the vibration of the brush 4 in this way, the generation of vibration noise due to the vibration, the instability of contact between the commutator 24 and the brush 4, the generation of gripping vibration, and the generation of gripping noise caused by gripping vibration can all be reduced.

As described above, the brush 4, which is a part of the steering-assistance motor 5 of the electromotive power steering device, has a molded body 40 that is molded from carbon material containing, for example, copper. Then, the groove 4A, which runs along the direction of the axis of rotation on the top surface of the molded body 40, and curved margins 4C, which are on both ends of the top surface in the direction of the axis of rotation, are formed during molding. Further, by cutting away the central part of the top surface of the molded body 40 facing the direction of the axis of rotation along the direction of cutting, the brush 4 comes to have contact surfaces 4*a*, which contact the periphery of the commutator 24, and non-contact part 4*b* and non-contact parts 4*c*, which do not have contact with the periphery of the commutator 24.

Further, as long as the brush 4 slants at both margins of the top surface in the direction of the axis of rotation and the contact surfaces 4*a* are between the slanted margins and the cut-away central part, the shape, dimensions and surface area of the contact surfaces 4*a* are not particularly limited. For example, in the present embodiment, the contact surfaces 4*a* are curved as indicated in FIG. 5(*b*), but they may be straight lines. Moreover, in the brush manufacturing process, in order to reduce the number of steps, the margins of the molded body were formed into a curved surface in the process of molding the molded body 40, but this may be done in a processing step other than the molding process.

An embodiment of a suitable example of the present invention was concretely described above, but the present invention is not limited to the embodiment described above, and the various configurations and manufacturing processes, etc., may be suitably modified.

What is claimed is:

1. A method of manufacturing a brush which has a central part of a surface of a conductive member that is to make pressure contact with a rotating commutator which is cut away to form contact surface parts, which contact surface parts make sliding contact with said commutator, and a non-contact surface part, which does not make contact with said commutator, the method comprising the steps of:

molding the conductive member to have two margins of said surface, which are separated by a distance defined in the direction of the axis of rotation of said commutator, which margins are made into forms that slant away from the commutator in an outward direction along said direction of the axis of rotation, wherein the conductive member is molded such that a top surface of each of the two margins is respectively defined by an arc; and cutting away said central part to form said contact surface parts between said margins and said cut-away central part, wherein said central part is cut away such that said contact surface parts are shaped as curving bands, each respectively aligned in a sliding direction of said commutator.

2. A motor manufacturing method that provides a brush which has a central part of a surface of a conductive member that is to make pressure contact with a rotating commutator which is cut away to form contact surface parts, which contact surface parts make sliding contact with said commutator, and a non-contact surface part, which does not make contact with said commutator, the method comprising the steps of:

molding the conductive member to have two margins of said surface separated by a distance defined in the direction of the axis of rotation of said commutator, which margins are made into forms that slant away from the commutator in an outward direction along said direction of the axis of rotation, wherein the conductive member is molded such that a top surface of each of the two margins is respectively defined by an arc;

cutting away said central part to form said contact surface parts between said margins and said cut-away central part, wherein said central part is cut away such that said contact surface parts are shaped as curving bands, each respectively aligned in a sliding direction of said commutator; and installing the brush molded by said molding process on a motor.

3. A brush which has a central part of a surface of a conductive member that is to make contact with a rotating commutator which is cut away, the brush comprising:

contact surface parts that make sliding contact with said commutator; and non-contact surface parts that do not make contact with said commutator, wherein the surface of the conductive member includes two margins separated by a distance defined in the direction of an axis of rotation of said commutator that are slanted away from the commutator in an outward direction along said direction of the axis of rotation and a top surface of each of the two margins is respectively defined by an arc, and wherein said contact surface parts are formed as curving bands, each respectively aligned in a sliding direction of said commutator between said slanted margins and said cut-away central part.

4. A motor comprising the brush according to claim 3.

5. An electromotive power steering device comprising the motor according to claim 4 and a transmission mechanism that transmits the rotation of said motor to a steering member.

* * * * *